United States Patent [19]

Falconer

[11] Patent Number: 4,536,042

[45] Date of Patent: Aug. 20, 1985

[54] PIVOT BEARING

[76] Inventor: David G. Falconer, 4673 S. 34th St., Arlington, Va. 22206

[21] Appl. No.: 623,450

[22] Filed: May 10, 1984

Related U.S. Application Data

[63] Continuation-in-part of Ser. No. 430,704, Sep. 30, 1982, abandoned.

[51] Int. Cl.³ .............................................. F16C 32/02
[52] U.S. Cl. ..................................... 308/2 A; 403/291
[58] Field of Search ............... 308/2 A, 2 R; 403/291, 403/270, 225, 121; 464/69, 160, 161, 101, 100, 84, 82, 55, 77

[56] References Cited

U.S. PATENT DOCUMENTS

| | | | |
|---|---|---|---|
| 1,268,632 | 6/1918 | Schauffelberger | 464/101 |
| 2,757,050 | 7/1956 | Weber et al. | 308/2 A |
| 2,814,187 | 11/1957 | Babaian | 464/84 |
| 2,951,695 | 9/1960 | Stone | 308/1 R |
| 3,452,608 | 7/1969 | Stiles | 464/101 |
| 3,473,349 | 10/1969 | Tateyama | 464/101 |
| 3,576,136 | 4/1971 | Myers | 384/215 |
| 4,000,659 | 1/1977 | Li | 308/2 A |

Primary Examiner—Stuart S. Levy
Assistant Examiner—Thomas R. Hannon

[57] ABSTRACT

A pivot bearing comprises an outer ring-like structure and an inner concentric central structure. Each structure holds cams usually having one type of contour, an involute contour on the outer structure and a cylindrical contour on the inner structure e.g. Flexible pendulums cut to length are affixed at one end to each individual cam of the outer involute cams and at their opposite ends to each individual cylindrical cam. The intermediate area of the pendulums between the fixed positions of flexible pendulums tautly and contiguously envelop the cam contours. The center structure, which may serve as a shaft, is held concentric and free to pivot from one ambit to the other ambit in apposition to each position.

6 Claims, 21 Drawing Figures

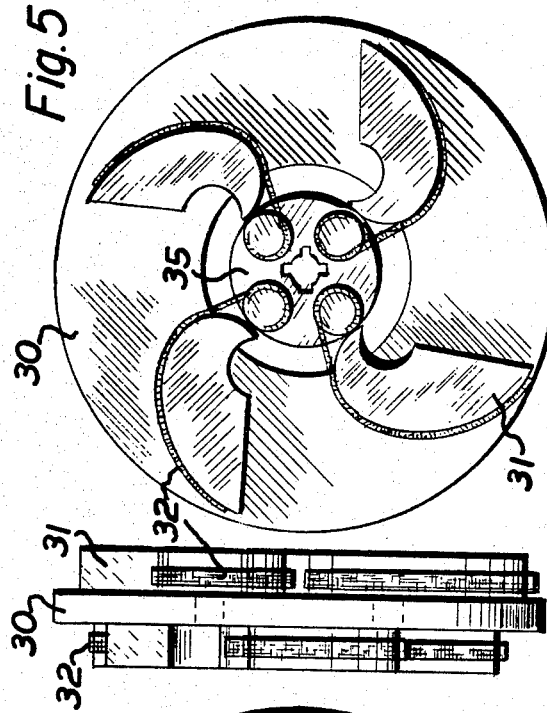
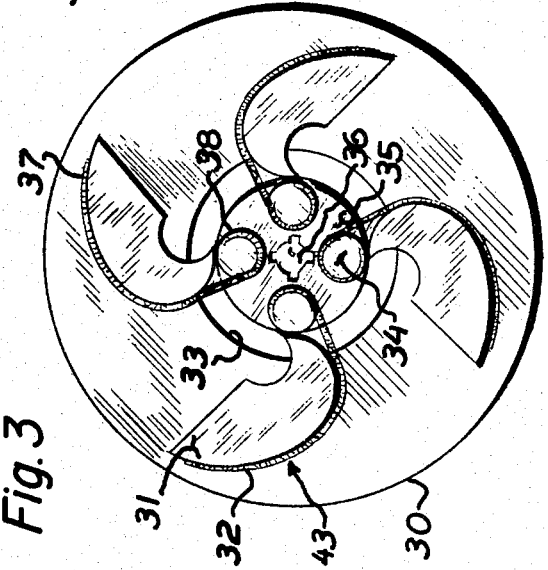
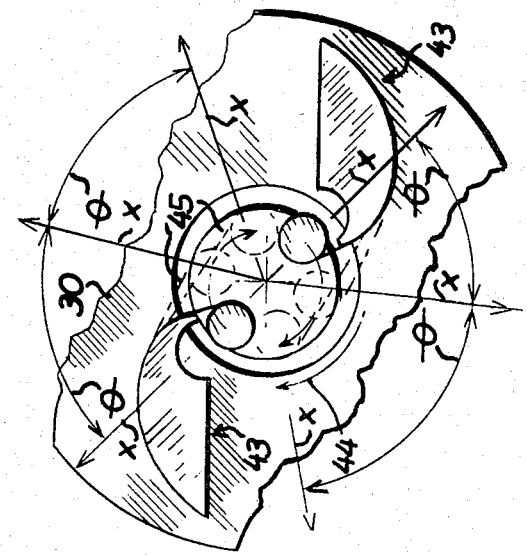
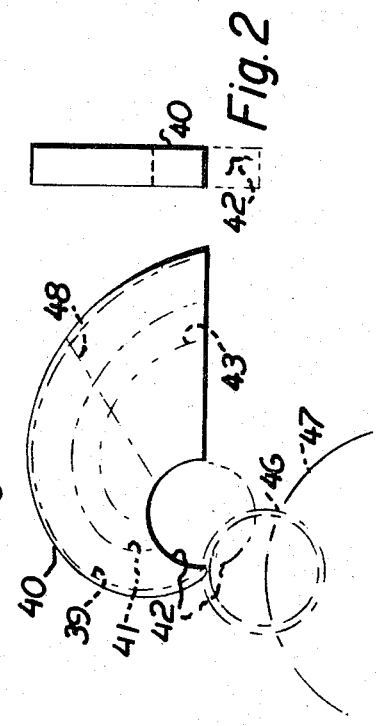

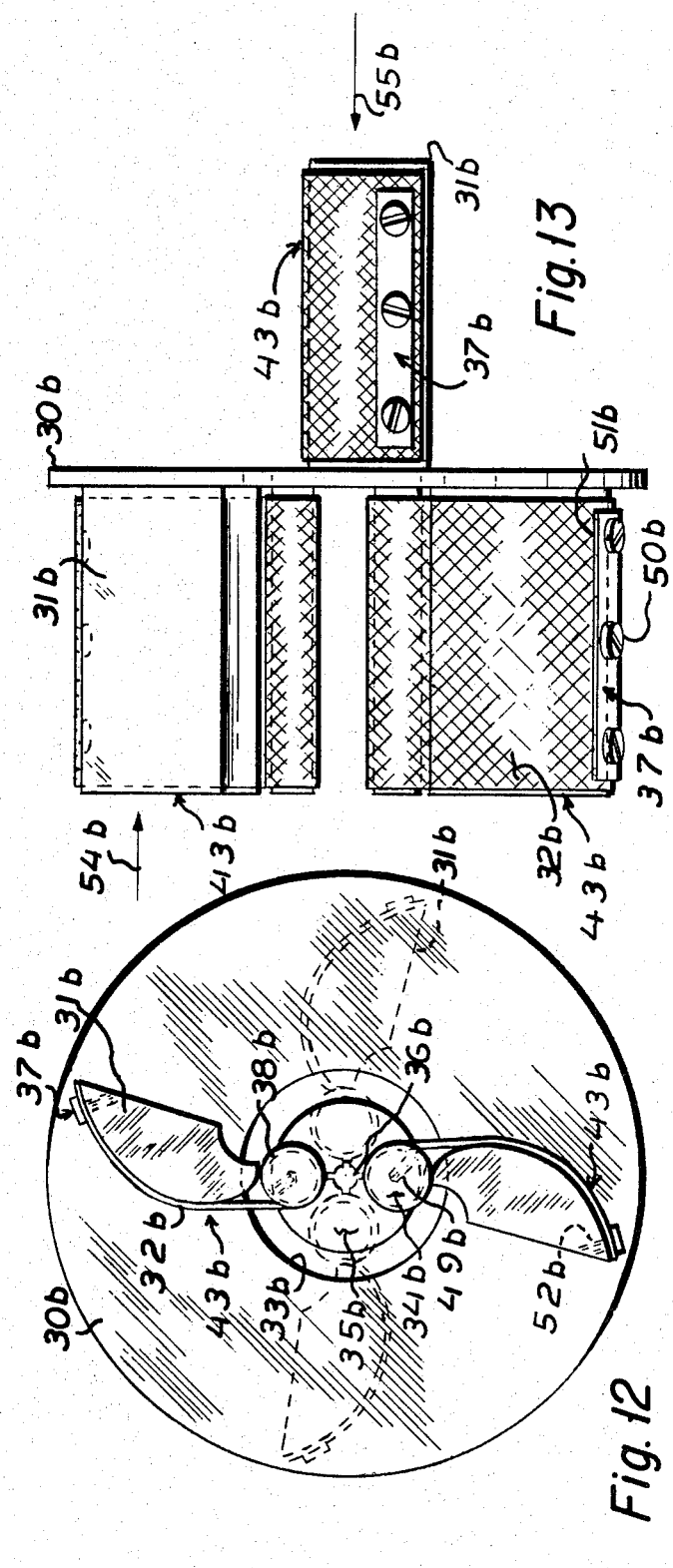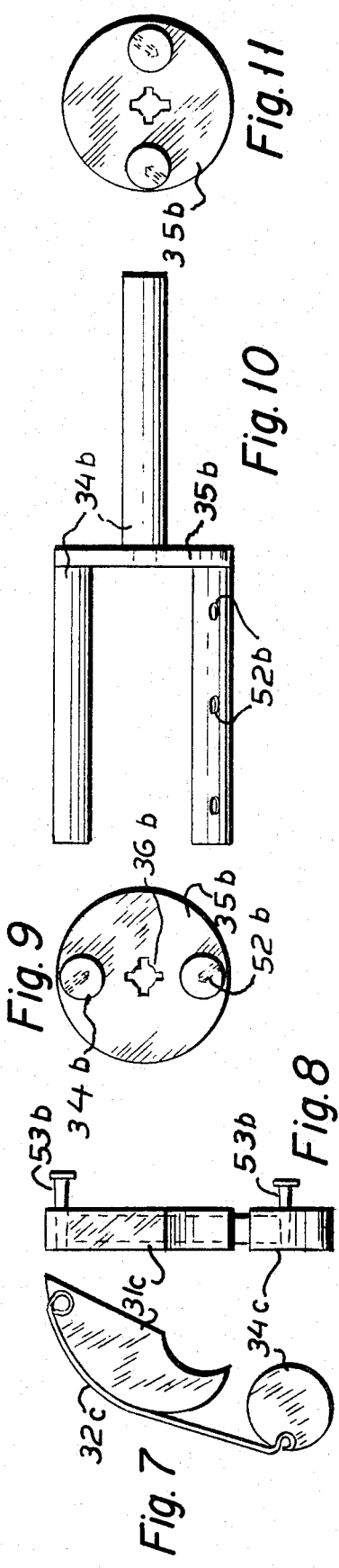

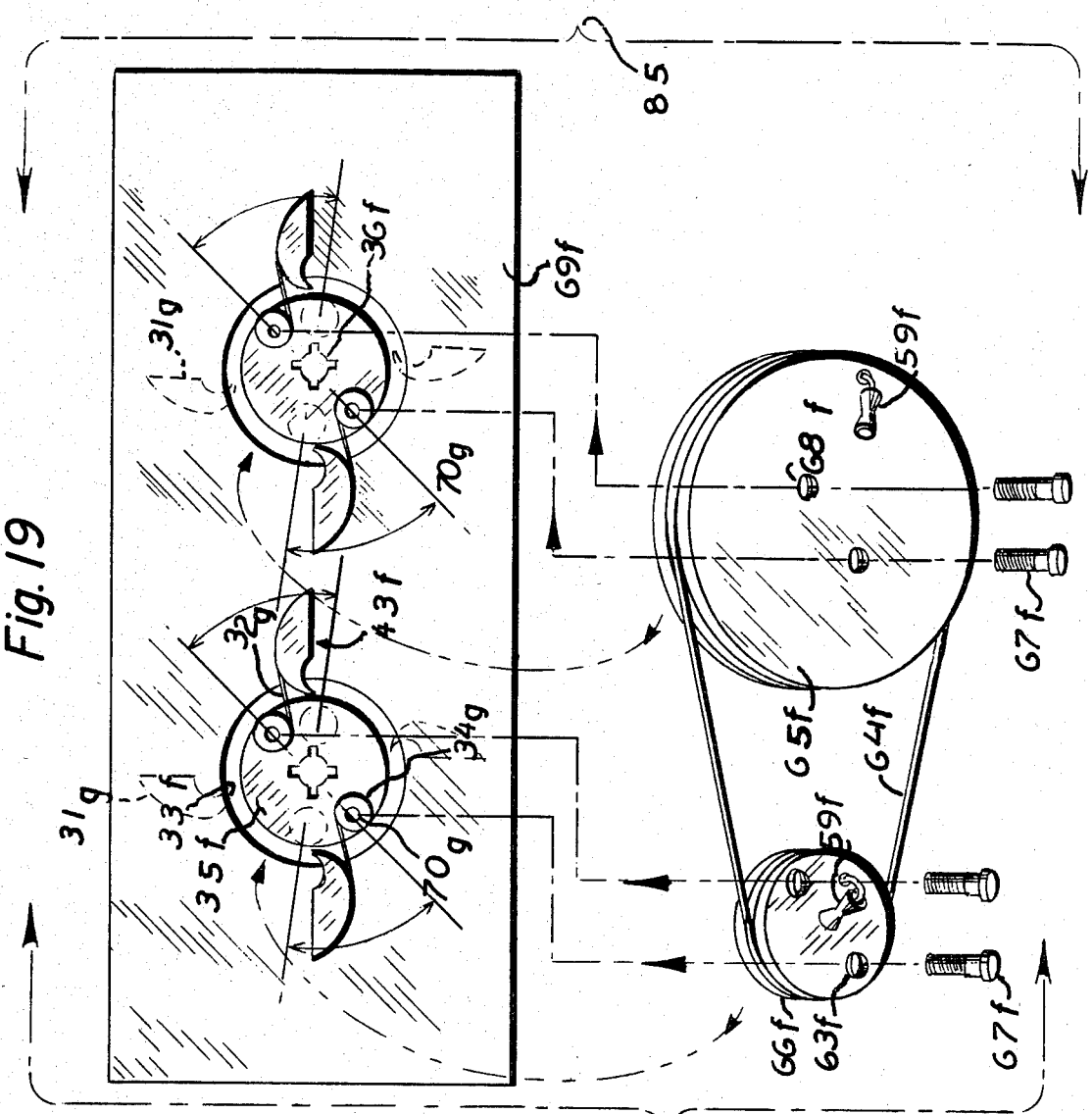
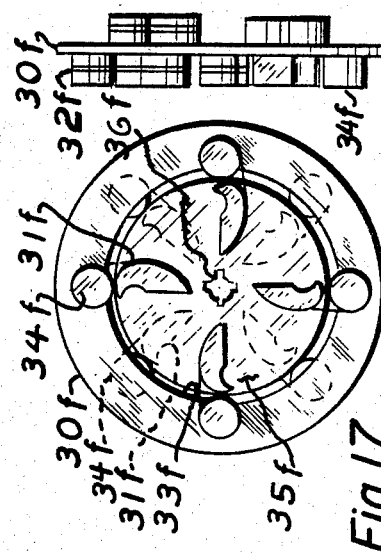
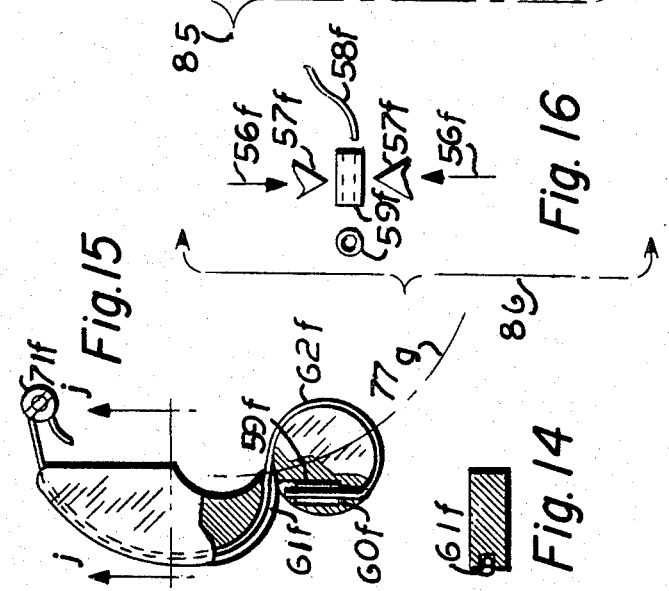

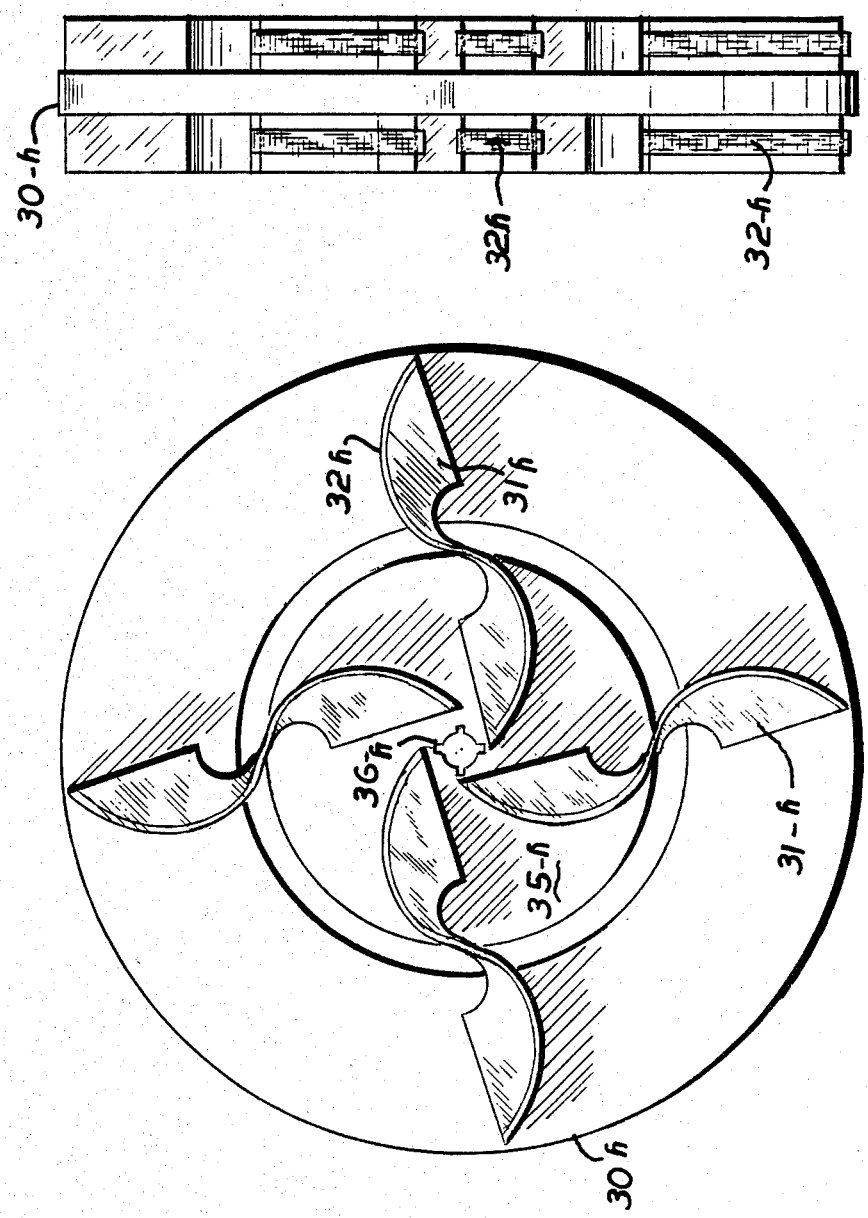

PIVOT BEARING

This is a continuation of Ser. No. 430,704 filed Sept. 30, 1982, now abandoned.

THE BACKGROUND OF THE INVENTION

This invention belongs in a general category of pivot and pendulum bearings generally useful in sensitive instruments. Its structure appears to be unique to such a degree that a detailed comparison to prior art would belabour the reader. This invention is an attempt to equal or to better the low friction encountered in a conical or knife-edge bearings found in a typical balance scale or the support of a clock pendulum while, at the same time, greatly increasing the range of movement and load-bearing capacity. Its rotational limit is not infinite as that of a wheel, but more like that of a dial pointer.

SUMMARY OF THE INVENTION

A primary purpose of this invention is to provide a pivot bearing of such sensitivity that it can be used in the more sensitive instruments. Two ready examples are seismographs and accelerometers. It is free from the necessity of lubrication, protection against dust contamination and temperature changes. The example of a shaft serving as a pivot or pviotal bearing should be brought up in passing, in which the ends of the shaft are turned into a cone and it is fitted into a race of ball bearings.

A GENERAL DESCRIPTION OF THE DRAWINGS

FIG. 1 shows diagrammatically the development of an involute curve together with its modified involutes fitted inside of the involute curve and the parent or the base circle from which the involute curve was developed.

FIG. 2 is a side view of FIG. 1.

FIG. 3 represents the plan view, or the face, of the first pieces of the invention, while FIG. 4 is a view to the reader's right of FIG. 3.

FIG. 5 is the obverse view of FIG. 3 or, better or should be the plan view from which FIG. 4 could have been taken.

FIG. 6 is a fragmentary view of the mechanics of the action of a cylindrical cam and the involute to which it is a mate and of the forces involved in its operation from ambit to ambit.

FIG. 7 shows a means provided for joining an involute cam to a cylindrical cam and FIG. 8 is a side view of this illustration.

FIG. 9 is a plan view of a sub-assembly of a new species of cylindrical cams which are placed in vertical stress or undue stress along its longitudinal axis, and FIG. 10 is a side view of FIG. 9.

FIG. 11 is the opposite view taken at the reader's right of FIG. 9.

FIG. 12 is a plan view of the new species just mentioned in connection with FIG. 9, FIG. 10, and FIG. 11, and FIG. 13 is a side view of the full assembly of FIG. 12 at the reader's right.

FIG. 14 is a sectional view taken at J—J of FIG. 15.

FIG. 15 shows the method of installing a pendulum in the sub-assembly of a cylindrical cam with an involute cam and rendering it taut.

FIG. 16 shows a means and a tool of crimping the ends of a cable-type pendulum.

FIG. 17 is the plan view of one of those pieces, having four sub-assemblies of cylindrical cams and involute cams on each side in a staggered position.

FIG. 18 is a side view of FIG. 17.

FIG. 19 is a view of a new species not shown previously. This species is a sub-assembly not complete but placed in brackets, 85. It shows two pivot bearings mounted upon the same board and there are two pulleys joined by an ordinary belt which are attachable to the side-by-side species of the pivot bearings on the board I just mentioned.

FIG. 20 shows the same types of species of FIG. 3, FIG. 4, and FIG. 5 except that the set of cams 31 of the outer structure and the cams 34 of the inner structure are both of the involute or modified involute contour cams.

FIG. 21 is a side elevation of FIG. 20 to the reader's right.

A DETAILED DESCRIPTION OF THE DRAWINGS

FIG. 1, being a strictly diagrammatic illustration, certain liberties ordinarily not taken have so been taken here. A void (42) will be noticed and this void continues in phantom lines (also 42), as if it had been a magic plug taken out of the piece shown, whereupon a taut string in conventional manner had been wound around this cylinder (42) until its end described a typical involute. Actually, this was done in quarter-inch plywood ten times the size that had been intended and then it was reduced with the aid of a pantograph and milled down to its present size on the paper. It will probably also be noticed that it is much more accurate than the corresponding involue cams on the other figures, if one will take a quick glance at those. They are merely pictorial but here it is wished that an explanation of the orientation of an involute (40-A) is shown in a neutral relationship with a cylindrical cam (46), which is situated upon, also, a phantom line serving as a the center line (47) of, say, for instance, FIG. 3, and the cylindrical cams of that figure (38), so this line (47) serves as being that center line and cams 34. Note that the point at which the involute (40) breaks away from the parent or base circle (42), that it is central and accurately centered. Note, also, that three phantom lines circle within the line which forms the contour of the involute (40) of FIG. 1 and that they are obviously of the same shape. These are called modified involutes throughout this patent and within the claims. These modified contours (39, 41, and 43) follow inside the contours of the involute contour (40) and every point on these modified involute cams, forms a more acute curve, lies at a point at a uniform distance on a line drawn at any infinite spacing perpendicular to a tangent to said involute curve at the point of tangency with said involute curve, and between said involute curve and the circle of generation from which said involute curve has been developed, the degree of acute curvature being a matter of judgement; while an unmodified involute is easier to manufacture at first, the modified first surface (39) will lie at a distance which, when measured from the involute contour (40), is exactly equal to the thickness of the pendulum which might, in certain cases, be wrapped around the line (39). This would be tantamount to having a pendulum of zero thickness and this happenstance would occur where the origin, that point of the involute cam which touches the center of the cylindrical cam, moved to the right of the reader. This should be quite easily seen and, of course, there is another way of accomplishing the same effect and that would be if the contour delineated by the line, counter line (40), were to be left as it is, as it has been formed, and an amount taken off of the cylindrical cam (46) equal to the thickness of the pendulum, because less sophisticated equipment would be required and an involute object is more difficult to exact measurement for checking purposes to ascertain if it conforms to specifications than would be a simple round cylinder, obviously. However, if the cylindrical cam (46) is left in its place as shown in FIG. 1, and the involute cam (40) were moved to the left of the reader, and a line (48) had some place conveniently located and leaving enough room for the pendulum were cut, there would be no necessity for trimming either the involute cam (40) or the circular cam (46). Of course, the ultimate purpose of using modified involute cams and smaller cylindrical cams in conjunction is to allow more pivotal traverse, which is highly desirable. Before reading FIG. 1, it should be pointed out that the proper conjunction and configuration of the modified involute (40-A), which is demarked by the line (39), and of the modified involute (41-A), demarked by line 41 and that of 43-A demarked by 43 in proper conjunction with the size and the position of the cylindrical cam (46) fixed on their center lines (47), amount to nothing less than the sine qua non of the operation of the whole pivot bearing, that the adjustment of pendulums can be relied upon to be flaccid in its natural state, but pulled taut and contiguous consistently means that a pivot bearing miore than competitive with these super-precision pivot bearings made out of special steels are on the market today. FIG. 3 shows the outer ring on a base (30) with a void in a central opening (33) upon which are mounted on this side of the base four modified involute cams and an inner, central, relatively pivotal base or shaft. Note that the inner face also has a concentric bore (36) which is splined for the use of a supplementary shaft. However, the shaft can be affixed on top of the cylindrical cams (34), of which there are, naturally, four, being each mated to the modified involute cams (31), in this case tied to both the modified involute cams and the cylindrical cams by a belt of fiber glass 4/1000 of an inch thick. The tolerance of the fiber glass is surprisingly close and held so. They are affixed to the modified involute cams at a point (37) in each case, natuarally, and they are also affixed to a point (38) on each of the cylindrical inner cams. This can be done in the case of fiber-glass tapes, at least with modern high-strength aircraft cements, and they will not yield in fixing these tapes to the cams. An tension instrument must be used and both the inner, relatively movable plate (35) and the outer ring structure or base (30) must be held, naturally, in a fixture or a jig, permitting no movement. The inner cylindrical cam, it is felt, should be fastened first at the point (38) to the cylindrical cam and held until dry or set. A meter should then be applied to the outer end of this fiber-glass tape (32) at the point of adhesion (37) and it should be stretched to the specifications of the manufacturer of fiber-glass tape. This is, of course, extremely important. In the first place, the fiber glass has a yield point which is quite close to the ultimate strength and a very slight margin should be left. It is then cemented in place and held with the meter attached. When the cement is dry, it may be safely takn off. Note that FIG. 4, being a side view to the reader's right of FIG. 3, shows the familiar figures of FIG. 3. FIG. 5 is the obverse or opposite side of this species shown by FIG. 3. It is identical except that it is felt best to stagger the outer cams, the modified involute cams (31). FIG. 6, being a fragmentary diagram, shows some of the points which should be brought up with respect to FIG. 3 and, in fact, all of the figures of this invention. The arrows (X) show completely random positions which would be taken in the pivoting action of the pivot bearing. If the bearing has parts which have been inspected and meet the standards which have been set up, any meter measurement at any of the random angles (theta) should register the same. If may be, of course, taken out of the assembly fixture but if there is any difference, this could mean that either an error was made in assembly or it could mean that the tolerance on the cams has been exceeded because, theoretically, a perfect cylindrical cam (34) in FIG. 3 should absorb as a reservoir all of the flexible tape or flexible pendulum, as it should be called, and there should be no slack at any angle (theta). The meter registering within the prescribed limits should show that the sub-assemblies of the cylindrical cams with their mating modified involute cams generally denoted as a sub-assembly by the arrows (43), should be within tolerance. The direction of the central base (35) should be seen by the arrows (44). The phantom lines (45) represent the different positions were they stilled in their movement at random points, and if any slack was apparent in any of these tapes at any point, the disparity should be instantly recognizable.

Next, considering FIG. 7 and its side view, FIG. 8, first of all, the cylindrical cam (34-C) is shown with its mating modified involute cam (31-C), in which the flexible pendulum (32-C) has been joined. In these figures a method of positively joining tapes or cables, or whatever flexible material is used as a flexible pendulum, a tapered pin (53-B) is shown inserted in a mating tapering hole in each of the cams to be joined. It is suggested that, as before, the junction of the pendulum is made first to the cylindrical cam, and this can be done in a number of ways. One method will entail having a split or fissure in the tapering pin and the end of the pendulum is inserted into this split. It is then inserted into the hole which, as can be seen, has access to the outside. It is then pressed in and if it is a sticking taper made to the same degree of taper as an ordinary taper pin, for instance, it can be relied upon not to rotate; however, aircraft cement can be used. After this has been done, the same procedure can be used in the modified involute cam except that it will be noticed that there is a head on each of the tapered pins (53-B). This can be knurled or slotted or made into a hexagon shape, or any other convenient means of gaining a tight purchase upon it. The two members, the cam 34-C and the cam 31-C, presumably are in their permanent position in a jig or a fixture. The topmost tapered pin (53-B) inserted into the modified involute cam (31-C), can then be rotated by the aid of a torque meter so that uniform torque may be effectuated with any of the mating cams, and remembering that both the inner rotating plate, or pivoting plate, and the outer ring (30-B), for instance, in FIG. 13, the inner plate (35-B) in FIG. 13 cannot move relative to each other while in the fixture. Any fault which may later show up on inspection is due to factors other than a fault in tension. In FIG. 9 (34-B), shown twice, for there are two in this species, are shown, and in these circular cams are shown, in dotted lines (52-B), screw holes. Concentrically located is the familiar splined hole or bore to receive a supplementary shaft, should that be necessary, remembering that this central plate (35-B) in FIG. 10 and in FIG. 9 is capable of acting as a shaft member itself. Thus, it is a convenient spot for fastening either a shaft of a different kind or having a work piece directly attached to it, a work piece such as a lever which it is desired to pivot. FIG. 10 is the side view of FIG. 9 and it shows a lower set of cylindrical pins at right angles to those in FIG. 9. FIG. 11 is, of course, just the bottom view of FIG. 10. The word "bottom view" is used because this figure in FIG. 10 and FIG. 9 are parts of FIGS. 12 and 13, which have been detailed for convenience. In FIG. 12 and FIG. 13 the typical species shown before in FIG. 3, for instance, is also repeated here but, in this case, this species answers the need for a vertically mounted pivot in which the stress, indicated by arrows (54-B) in FIG. 13 and 55-B in FIG. 13, along the longitudinal axis of the pivot bearing. It seems that most of the numerals will be quite easily recalled, having a distinct family resemblance to any of the other species. There is, for instance, the plate and the ring structure (30-B) and the opening (33-B) to receive the inner or central plate which pivots relatively to the plate (30-B) and is designated by numeral 35-B. This species uses a fiber-glass fabric cloth which the manufacturer has state can be manufactured to the specifications called upon, to wit, that the fibers within the matrix material are crossed at a 45-degree angle with the run of the bolt of the fiber-glass cloth. This means that when the fiber-glass cloth (32-B of FIG. 13) is fixed to both the cylindrical cams (34-B) and the modified involute cam (31-B), that the fact that the fiber-glass strands within the matrix are at such an angle forms the familiar X-type of frame which is, naturally, so respected in any engineering structure. Models have been tried and supported as they are. They show no sag within reasonable limits. The method of fastening the cloth to the solid cams is shown by a generalizing arrow (37-B). A strip of metal (51-B) is secured through the fiber-glass cloth and a layer of aircraft-type cement is placed along the thin border underneath the fiber-glass cloth to hold it to the cams. The screws then fasten the strip of metal (51-B) to the cam in all of the cases and the fiber-glass cloth is thus secured to the cams.

With reference to FIG. 15, which shows a subassembly of a modified involute cam and a cylindrical cam fastened together in this species, a hole (60-F) is drilled into the cylindrical cam to a fixed depth and the end of a cable (62-F) is crimped with a special sleeve, which will be shown in FIG. 16. This should be done as the first operation and the whole assembly should be placed in a fixture or a jig, as has been done before. With the fixture holding the two cams in proper orientation, a capstan-like fitting (71-F) is wrapped around by the cable (62-F) and is turned, again making use of a tension torque meter to apply the proper tension to the cable, and it is fastened securely. The capstan (71-F) can be either a threaded member or a tapered member, as has been mentioned before; either will hold equally well. Several turns of the cable (62-F) should, of course, be made and some type of cement should be applied. The center line (77-G) is the center line, of course, of the cylindrical cam and it is in proper relationship and shows the orientation of the two cams in the sub-assembly. FIG. 14 is a cross-section of the modified cam taken at J—J of FIG. 15 and shows the groove which has been cut around the periphery of the modified cam. This groove (61-F) also shows a section cut through the cable (62-F). In FIG. 16 the sleeve (59-F), mentioned in FIG. 15 and Section J—J in FIG. 14. The, in FIG. 16, the manufactured sleeve (59-F) is shown with an end of a cable, any cable (58-F), being pressed into the sleeve while the crimping tool at the top and at the bottom, an anvil and a hammer or a punch and a die (57-F) are shown by arrows (56-F) to be crimping the sleeve (59-F). This operation is shown in brackets (86). FIG. 17 shows a typical descendant of the previous species such as FIG. 12 and FIG. 3, except that the cylindrical cams (34-F), being on the outer structure (30-F), and the modified involute cams (31-F), being mounted on the central relatively pivoting base (31-F), other familiar numerals, as are the splined bore. If a supplementary shaft is needed, concentrically located, this bore (36-F) is present, as are the dotted lines showing 34-F and 31-F on the obverse side from the reader. To the reader's right is FIG. 18, which also shows the righthand view of FIG. 17. FIG. 19 is shown within brackets (85) and it is placed to show certain versatilities of the subject of the invention. One such versatility, rather unusual in any type of bearing, is the lack of bearing pressure as a factor in rotation, since both species are mounted on the same plate instead of being separate as in all of the previous figures. It will be seen that if a pulley is mounted upon the pivoting base (35-F), and another pulley is mounted on the adjacent pivoting base, and the pulleys are under tension, that ordinarily a force to be dealt with by pressure and friction would be present. In the figure below, showing two pulleys (66-F and 65-F), held under tension, presumably by a belt (64-F) about to be mounted, as shown by customary arrows and double-dashed lines, as in any "exploded" view in this type of drawing. It will be seen that the machine screws (67-F) penetrate the holes (63-F and 68-F) and hold both the small pulley (66-F) and the larger pulley (65-F) to the tapered holes in the tops of the cylindrical cams (34-G). Tension caused by the belt (64-F) results in tension upon the flexible pendulums (32-G) and this has been found not to impede the rotation considerably; it is a negligible factor. FIG. 20 contains all of the parts with their family resemblance numerals, except with an H following the numerals. In this case the species contains the outer ring structure (30-H), the inner-ring relatively moving structure (35-H), the optional shaft bore (36-H), and a set of four mating modified involute cams, making a total of eight altogether, two in each pair, and the opposite side is either identical or has the pairs of of modified involute cams staggered, that is, fixed in-between the paired modified involute cams on the side facing the reader. All of this is seen in FIG. 21 as well. In FIG. 21 the fiber-glass pendulums (32-H) can easily be seen. However, the exact means of fastening them to the cams has been omitted, having been described so many times before.

It will be obvious to those skilled in the art that various changes may be made in the invention without departing from the scope and spirit of the invention; therefore, the invention is not limited to what is shown in the drawings and described in the specification but is to be determined from the appended claims.

I claim:

1. A pivot bearing for use in sensitive instruments in which a shaft structure is suspended by flexible pendulums so that sliding friction and conventional rolling friction is eliminated; said pivot bearing comprising a first set of cams arranged circumferentially mounted on an outer ring-like plate face, each individual cam of said first set of cams being positively fixed to one end of a flexible pendulum; an opposite end of said flexible pendulum being positively fixed to an individual cam of a second set of cams, said second set of cams concentrically encompassed by said first set of cams and arranged circumferentially adjacent a periphery of a utility plate face, said utility plate serving as a base and center for fastening work pieces and having a shaft bore for fitting to a longer shaft, said bore being concentric to a center of pivotal mobility, said outer ring-like plate and utility plate lying in a plane normal to the pivotal axis of said first and second sets of cams; at least one set of cams having a contour of an involute; said flexible pendulums having an intermediate section between the positively fixed ends of said flexible pendulums, each of said pendulums made taut at manufacture and remediable after manufacture by adjustment to a degree, each pendulum having the same adjustment degree as measured by an instrument for measuring tension, and each individual pendulum being contiguous to said contours of said cams, irrespective of the pivotal degree of rotation and position of said utility plate, so that concentricity of said shaft bore is maintained, and said pivotal mobility is made at manufacture.

2. The pivot bearing of claim 1 wherein a plurality of cylindrical contoured cams form the first set of cams on the outer ring-like plate and a set of modified involute contoured cams form the second set of cams fastened to said utility plate; and wherein on an opposite face of said outer ring-like plate is arranged a third set of cams of identical modified involute contour as said first set of cams, and on an opposite face of said utility plate is arranged a fourth set cams of identical contour as said second set of cams, the sets of cams on one face of the ring-like plate and utility plate being staggered with respect to said cams on said opposite faces.

3. The pivot bearing of claims 1 or 2 wherein said sets of cams have contours of an involute form.

4. The pivot bearing of claims 1 or 2 wherein said sets of cams have contours of a modified involute form.

5. The pivot bearing of claim 1 wherein a spring material is used for said pendulums.

6. The pivot bearing of claims 1 or 2 wherein said first set of cams, said second set of cams, and said flexible pendulums coact whereby a lateral load on one of said sets of cams is transmitted as tension in the flexible pendulums.

* * * * *